June 4, 1957  T. J. CRAWFORD  2,794,893
INDUCTION WELDING
Filed Oct. 13, 1953  2 Sheets-Sheet 1

INVENTOR.
THOMAS J. CRAWFORD
BY
Oberlin + Limbach
ATT'YS.

June 4, 1957

T. J. CRAWFORD 2,794,893

INDUCTION WELDING

Filed Oct. 13, 1953

INVENTOR.
THOMAS J. CRAWFORD
BY
Oberlin + Limbach
ATT'YS.

United States Patent Office 2,794,893
Patented June 4, 1957

2,794,893

INDUCTION WELDING

Thomas J. Crawford, Berkley, Mich.

Application October 13, 1953, Serial No. 385,735

9 Claims. (Cl. 219—8.5)

This invention relates as indicated to induction heating and, more particularly, to an improved control of the energy supplied to a high frequency inductor used in continuous heat treating operations.

In continuous induction heating, that, is where there is relative movement between the work and inductor, a certain amount of mechanical variation in the coupling of the two is unavoidable, whether due to irregularities in the work, nonuniform movement or other causes, and such changes in the flux linkage of the work produce variations in the heating current induced therein. While some induced current variation is permissible in certain applications, in others it is less tolerable, and in all cases substantial constancy of the current is obviously advantageous.

As a more specific example of the type of system to which my invention primarily relates, reference is made to my copending application Serial No. 205,511, now issued as Patent No. 2,687,464, dated August 24, 1954, in which I have disclosed a novel method and means for the continuous production of tubing by induction welding. In accordance with such disclosure, a moving metal blank is shaped to tubular form by progressively bringing the edges thereof together, and such edges are welded at their point of juncture by a high frequency current induced therein. The current is supplied by a coil inductor spaced to the rear of the point of edge contact a predetermined distance such that the induced current will flow along the approaching longitudinal edges of the blank without flowing therebetween until the point of contact is reached. In this manner the current is sufficiently concentrated at the point of juncture to interfuse the seam edges.

In a system of the above nature, the seam edges are brought together by means of suitable squeeze rolls, or the equivalent, and there is a tendency for the point of contact to drift back and forth axially and, hence, relative to the stationary inductor. Since the resultant changes in the induced current here affect the weld stability, and also in other induction welding systems, some means of compensation is desirable. Likewise, where the induced current serves a metallurgical function in heat treatment of the work, the current should be as uniform as possible.

It is, accordingly, a principal object of my invention to control a high frequency induction heater in a manner such that the current induced thereby in the work will be substantially uniform despite mechanical variations in the coupling thereof.

Another object of my invention is to provide a control system operative in such manner which is rapid and automatic in operation.

A further object is to provide a self-regulating energy supply for use in induction welding effective to maintain the welding current substantially constant, thereby to improve weld stability.

It is also an object of my invention to compensate for fairly rapid changes in high frequency inductor operation by the use of a tuned inductor circuit having a definite frequency relation with the source of oscillating current.

An additional object is to further compensate for relatively constant changes in such frequency relation, for example, as caused by thermal drift of the frequency determining parameters of the inductor and source circuits.

Other objects and advantages of the invention will become apparent as the following description proceeds.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 2:
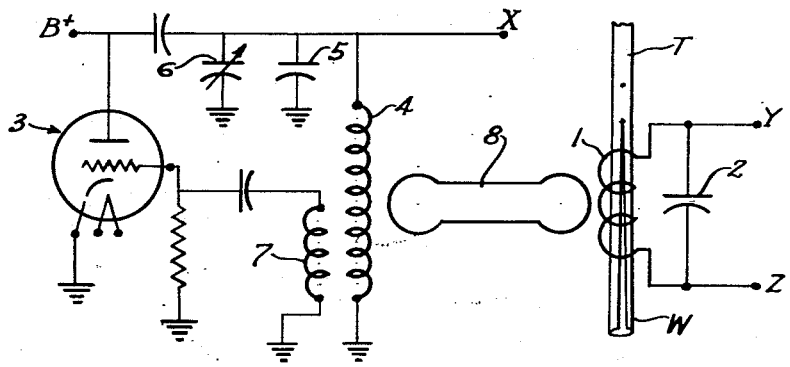
Fig. 2 is a diagrammatic representation of the inductor and supply oscillator circuits.
Figure 4:
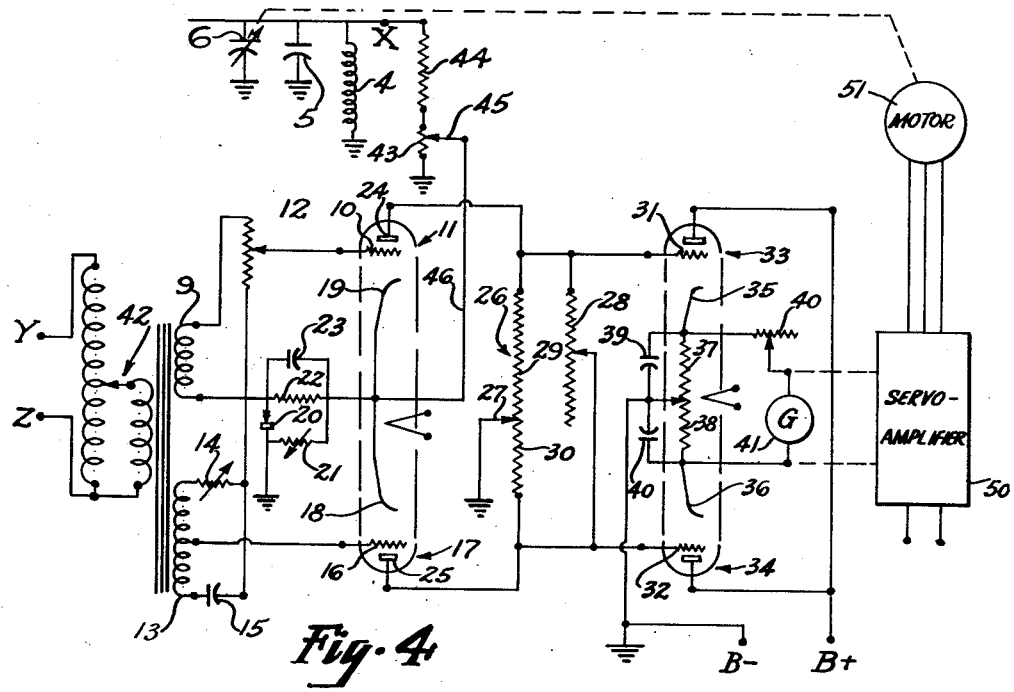
Figure 5:
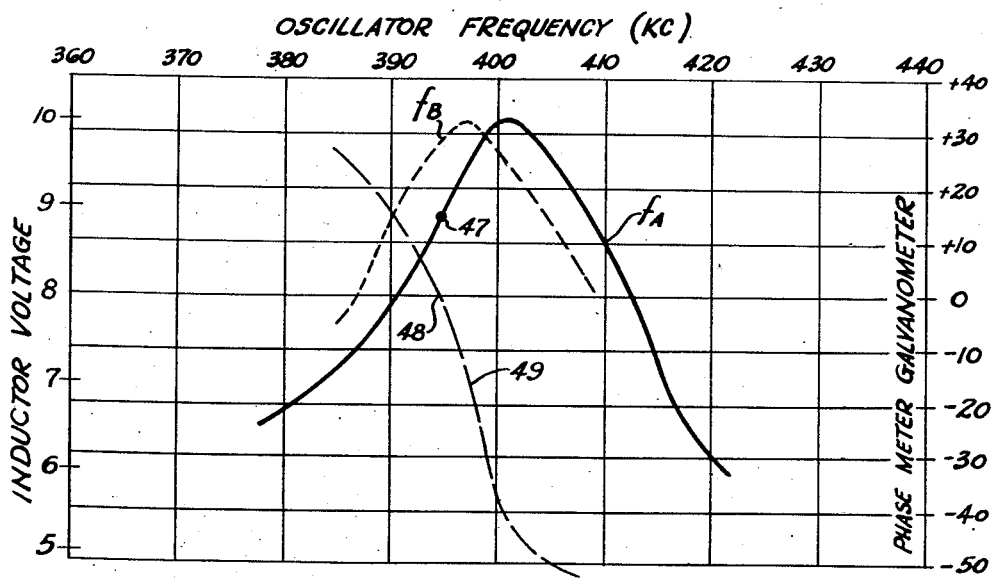

Fig. 4 is a wiring diagram of a circuit which may be used with that shown in Fig. 2 for the purpose of obtaining further protection against deviations from the desired operating conditions; and Fig. 5 is an experimental plot showing the relationship both of the inductor voltage and a signal indicative of the phase relation between such voltage and the source voltage with respect to oscillator frequency.

Figure 1:
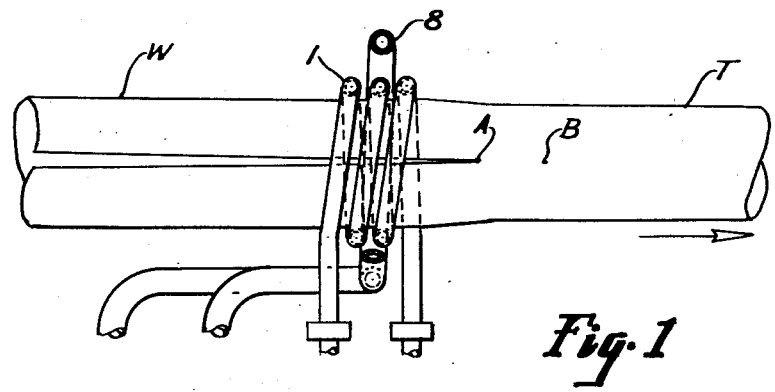
Fig. 1 is a top plan view of an induction heating coil in operative association with a continuously moving metal blank.

Referring now to the drawings in detail, in Fig. 1 I have shown an induction heating coil intended to be operative in the manner disclosed in my aforesaid copending application to produce continuous welded tubing. My present improvements will be described in connection with induction welding of this nature, to assist in an understanding thereof, and reference is made to such earlier application for a full and complete disclosure of the method steps and apparatus, other than relating to the energy control, preferably employed.

Briefly then, in accordance with my noted earlier disclosure, an induction heating coil 1 is disposed to surround a continuously moving metal blank W and, by inducing welding current therein, to form the tubing T. The blank is initially in the form of flat strip and is advanced through a plurality of roll stands which bring the blank edges progressively together in tubular form. A final set of squeeze rolls forces the edges into contact to form a seam, and it is at such point of contact that the induced current is effective to interfuse the edges.

The spacing of the inductor 1 relative to the point of edge contact, which we will assume to be at the point A, is critical, since such point must be spaced axially from the limit of the effective current-inducing portion of the inductor so that the induced current will flow lengthwise of the blank to pass around the open end of the seam. It will be noted that the inductor is spaced to the rear of point A, and, with the high frequencies normally used, the current will flow in opposite directions in the respective intervening portions of the seam edges. At the point of seam edge juncture, an extremely high current density is achieved and the welding effected, all as explained in my copending application mentioned above.

In actual practice, it has been observed that the point of contact moves toward and away from the inductor, and this, of course, causes changes in the induced current and the character of the weld formed. Since the induction welding operation is rapid, as a matter of fact at speeds higher than commercially used before my invention set forth in copending application 205,511, the shifting of the point is likewise quite rapid. Any effective compensating means must, therefore, be automatic and have a rapid response characteristic.

With reference now to Fig. 2, I achieve such compensation by the use of a condenser 2 connected across the induction heating coil to form a resonant circuit therewith, and tuning an electronic supply oscillator to a frequency slightly lower than the frequency of resonance of such circuit. The supply of the high frequency oscillating current is shown as comprised of a power oscillator triode, indicated generally at 3, and a tank circuit made up of the inductance 4, fixed capacitance 5, and variable capacitance 6, and a grid feed-back coil 7. This oscillator circuit is conventional as is the single turn link 8 which couples the tank inductance 4 and the inductance heating coil.

Figure 3:
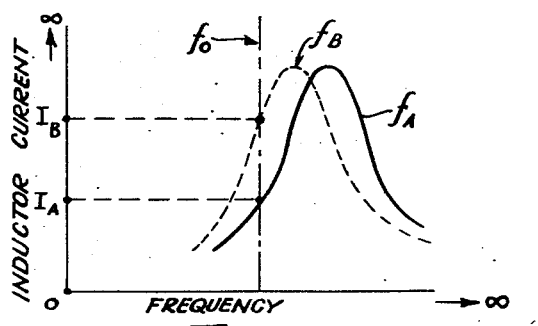
Fig. 3 is a plot illustrating the inductor frequency characteristics under certain assumed conditions of operation.

In Fig. 3, the frequency characteristic of the inductor when the point of welding is at a point A is shown by the curve $f_A$. The oscillator is tuned to a frequency indicated as $f_0$, which it will be observed occurs at a point on the substantially flat side portion of positive slope of the curve $f_A$. If it is now assumed that the convergence point moves from A to B, the resistance of the load coupled to the inductor increases and its inductance likewise increases. To obtain the same welding current, the induced voltage must correspondingly increase.

The increase in inductance of the coil 1 will automatically decrease the resonant frequency of its circuit, bringing it closer to the oscillator frequency $f_0$, as indicated by the second curve $f_B$ of Fig. 3. When this happens, a higher current will circulate in the circuit consisting of the inductor 1 and condenser 2, as shown by the increase of current from $I_A$ to $I_B$ in Fig. 3, more magnetic flux will link the tube blank W, and more voltage will be induced therein. It will be seen that this corrective action, obtained by correct choice of tuning, will maintain the welding current substantially uniform despite mechanical variations causing the convergence point to drift.

It is to be noted that in a self-regulating energy supply of this nature, the change in inductor current is directional and corresponds directly to the change in resistance of the load. While only a relative outward movement of the point A has been considered, it will be obvious that an inward drift would produce a decrease in the inductor current. If the oscillator and inductor circuit were tuned to resonate at the same frequency, any changes of the character indicated would produce a decrease in the inductor current regardless of whether the load resistance increased or decreased and, thus, no effective compensation would be obtained. Because of the particular load, it is desirable that the change in current be in a direction corresponding to the change in load resistance, thereby to eliminate any need for signal inversion, but in some instances the converse may be desired. In such a case, the oscillator frequency may be selected to be at a generally similar point on the flat side of the inductor frequency curve having a negative slope.

In addition to compensating the fairly rapid mechanical variations discussed above, it is desirable to insure that changes in temperature and the like do not upset the proper frequency relationship of the oscillator and inductor circuit. For this purpose, I provide the circuit shown in Fig. 4 which may be added to the circuit of Fig. 2 as indicated in the drawings and described below.

The Fig. 4 circuit is essentially a balancing circuit adapted to generate a signal which is an indication of the magnitude and direction of a shift in phase between two compared voltages. Disregarding for the moment the derivation of these two voltages from the Fig. 2 system, the compensating circuit, therefore, comprises two parallel branches operative to produce opposed potentials and a resultant signal which is the sum of such potentials. One of these branches comprises the input transformer winding 9 supplying voltage to the grid 10 of a first control triode, indicated generally at 11, through a divider 12. The input of the other branch is in the form of a split transformer winding 13 which, together with the variable resistance 14 and the capacitor 15, forms a conventional phase shift circuit for supplying a voltage to the grid 16 of a second control triode, indicated at 17, in quadrature with that supplied to the first triode grid. The two triodes are connected in opposition, and actually all components thereof may be in a single envelope. The bias for both the cathodes 18 and 19 is derived from the common network consisting of the rectifier 20, resistances 21 and 22, and capacitor 23. Connected across the plates 24 and 25 of the triodes is the resistance 26 having a variable ground contact 27. A smoothing resistor 28 is connected in parallel with resistor 26, and the two voltages appearing across the sections 29 and 30 of resistor 26 are applied respectively to the grids 31 and 32 of amplifiers 33 and 34. In circuit with the cathodes 35 and 36 of such amplifiers are bias resistors 37 and 38 with respectively associated parallel capacitances 39 and 40. Plate supply for the amplifiers, which may likewise be in a single envelope, is obtained from the terminal B+, and connected through a variable resistance 40 across the two amplifiers in a zero-reading galvanometer 41.

It will be apparent that when the voltages appearing across the resistance sections 29 and 30 are equal, there will be no reading on the galvanometer, and that a positive or negative reading will be indicated should one of such voltages exceed the other.

It will further be seen that the balancing of such voltages will depend on the conduction of the control triodes 11 and 17. That is, when such triodes are conducting equally no signal will be produced, but should they conduct unequally, a signal indicative of the unbalance will result.

The above described circuit is connected to the Fig. 2 circuit in a manner such to indicate the phase relation between the oscillator voltage and the inductor voltage. To this end, the input transformer windings 9 and 13 are commonly energized by an auto-transformer, indicated generally at 42, which is connected to the terminals Y and Z to bridge inductor 1 and capacitor 2. The oscillator voltage is applied to the compensating circuit by means of the variable resistance 43 connected at terminal X to be in parallel with the oscillator tank. A fixed resistor 44 is connected in series with such variable resistor, and the movable tap 45 of the latter connected by the lead 46 commonly to the cathodes of the control triodes 11 and 17.

Since the oscillator and inductor circuit normally resonate at different frequencies, there will be a predetermined phase relation between the oscillator and inductor voltages at the proper operating condition. The voltage supplied the triode 11 by the winding 9 will be in phase with the inductor voltage, while that supplied the grid of triode 17 will be in quadrature therewith. By proper balancing of the resistor sections 29 and 30, the two triodes may be made to produce equal and opposite output signals at the desired frequency and phase relations. As long as this condition exists, no resultant signal will be supplied to the galvanometer. Should, however, a change in the normal frequency relation occur, for example due to a change in the oscillator capacitance with temperature, there would result a change in the phase relation causing a change in normal triode conducition, thereby upsetting the balance. Such a shift in phase would be indicated by the galvanometer and the oscillator tuning may be adjusted to return it to the proper operating value.

This will appear more clearly from a discussion of Fig. 5 in which the curves $f_A$ and $f_B$ are similar to the curves of Fig. 3 in that they represent the inductor frequency characteristic at the correspondingly denoted points of welding contact. The compensating circuit, of course, has a time constant and this is such that it will be unaffected by rapid changes in the proper frequency relation, but will produce a control signal in response to relatively constant changes therein. Thus, the self-regulation described in connection with Fig. 2 will not cause actuation of the Fig. 4 circuit.

The desired point of operation, indicated at 47 on the curve $f_A$ in Fig. 5, is selected to occur intermediate the substantially flat side of the curve having a positive slope so that the normal expected variation in the frequency relation will not cause the point to pass to either the upper or lower curvatures. In this way, shifting of the point resulting from normal operation will be substantially linear. At point 47, the oscillator should be tuned approximately to 395 kilocycles, and, when so tuned, the contact 27 is adjusted so that a zero reading is obtained on the galvanometer. This point is indicated at 48, and having once established this condition, the oscillator frequency may be varied to plot the curve 49 which shows the relationship of the phase meter galvanometer reading with respect to such frequency.

Assuming now that the oscillator frequency either increases or decreases from the normal value of 395 kilocycles, a reading will appear on the galvanometer indicating the direction and magnitude of such shift in frequency. When this occurs, the variable capacitor 6 in the oscillator tank circuit may be manually adjusted until the galvanometer again reads zero, or, in other words, until the oscillator frequency has been restored to the proper value.

It will also be evident that should a shift in a phase between the oscillator and inductor voltages occur due to a relatively constant shift in the frequency of the inductor circuit, as distinguished from the rapid changes mentioned in the foregoing, this also will produce a resultant signal indicated by the galvanometer. For example, if the inductor frequency characteristic shifts and stays as indicated by the curve $f_B$, in order to retain the desired operating point on this new curve, the oscillator frequency will have to be reduced to approximately 390 kilocycles. In effect, the compensating adjustment in this case, until the galvanometer again reads zero, shifts the curve 49 bodily to the left so that it will read zero at this new value of oscillator frequency. This compensating circuit, therefore, may be used to neutralize any such steady state variations in the desired frequency relation.

The compensating control action may be made fully automatic, if desired, by applying the resultant signal to a conventional servo-amplifier shown generally at 50, rather than to the galvanometer, and a reversible motor 51 in the output of the servo-amplifier used to vary the capacitor 6 through a suitable mechanical connection, as indicated by the dotted line.

The above-described complete system, characterized both by a self-regulating energy supply and protection against inefficient operation due to temperature and like variable influences, affords a precise control of inducing current which is particularly advantageous in induction welding, since weld stability of a higher degree than obtainable heretofore may be realized. Although specifically described in connection therewith, it will be understood that the present system is not essential to successful welding in the manner set forth in my application Serial No. 205,511, but rather may be used in such welding as an additional refinement enhances even further the improved results obtained.

It will be apparent that the present invention may also be used to advantage in other and quite widely varying induction heating systems, and that various changes in the circuits described in detail, the manner of tuning and the like, will suggest themselves to those skilled in the art without, however, departing from the basic idea of the invention. Reference may also be had to my co-pending application Serial No. 320,201 filed November 13, 1952, in which certain modifications and improvements in my welding process and apparatus are disclosed which may desirably be employed in conjunction with the present invention.

Other modes of applying the principle of the invention may be employed, change being made as regards the details described, provided the features stated in any of the following claims, or the equivalent of such, be employed.

I therefore particularly point out and distinctly claim as my invention:

1. In tube welding apparatus wherein a moving metal blank is shaped by progressively bringing the edges thereof together and passed through an induction heating coil operative to induce welding current therein at a point of contact of such edges, a condenser connected to form a resonant circuit with said coil, and a high frequency electronic oscillator for supplying current to such circuit, said oscillator and such circuit being relatively tuned such that the latter will resonate at a frequency slightly higher than the oscillator operating frequency, whereby movement of such point of contact relative to said coil will cause the circuit frequency to vary and produce a corresponding change in the current flowing through the coil effective to maintain the induced welding current substantially uniform.

2. In heating apparatus including an inductor adapted to treat work advanced therethrough, means for automatically varying the current flow through the inductor to maintain the induced current substantially uniform despite mechanical variations in the coupling of the inductor and the work, said means comprising a condenser connected to form a resonant circuit with the inductor, a high frequency electronic oscillator for supplying current to such circuit, said oscillator and such circuit being tuned relatively such that the latter will resonate normally at a frequency slightly higher than the oscillator frequency, thus to produce compensating directional changes in the current circulating in such circuit in response to rapid fluctuation in the work coupling, and signal generating means responsive to phase difference between inductor voltage and oscillator voltage and operative to produce a signal indicative of a relatively slow shift in the frequency relation of said oscillator and such circuit.

3. In heating apparatus including an inductor adapted to treat work advanced therethrough, means for automatically varying the current flow through the inductor to maintain the induced current substantially uniform despite mechanical variations in the coupling of the inductor and the work, said means comprising a condenser connected to form a resonant circuit with the inductor, a high frequency electronic oscillator for supplying current to such circuit, said oscillator and such circuit being tuned relatively such that the latter will resonate normally at a frequency slightly higher than the oscillator frequency, thus to produce compensating directional changes in the current circulating in such circuit in response to rapid fluctuation in the work coupling, signal generating means operative to produce a signal indicative of a relatively constant shift in the frequency relation of said oscillator and such circuit, means for indicating the direction and magnitude of such a signal, and means actuatable to adjust the relative tuning of said oscillator and such circuit to compensate a thus indicated frequency shift.

4. In heating apparatus including an inductor adapted to treat work advanced therethrough, means for automatically varying the current flow through the inductor to maintain the induced current substantially uniform despite mechanical variations in the coupling of the inductor and the work, said means comprising a condenser connected to form a resonant circuit with the inductor, a high frequency electronic oscillator for supplying current to such circuit, said oscillator and such circuit being tuned relatively such that the latter will resonate normally at a frequency slightly higher than the oscillator frequency, thus to produce compensating directional changes in the current circulating in such circuit in response to rapid fluctuation in the work coupling, signal generating means operative to produce a signal indicative of a relatively constant shift in the frequency relation of said oscillator and such circuit, and means responsive to such a signal operative automatically to adjust the relative tuning of said oscillator and such circuit to maintain the predetermined frequency relation.

5. In tube welding apparatus including means for shaping a metal blank to tubular form by progressively bringing the edges thereof together, and a high frequency induction heating coil through which such blank is moved operative to induce welding current therein at the point of contact of such edges; means operative automatically to compensate for drifting of said point of contact with consequent variation in the inductive coupling of coil and work, said means comprising a condenser connected to form a resonant circuit with the inductor, a high frequency electronic oscillator for supplying current to such circuit, said oscillator and such circuit being tuned relatively such that the latter will resonate normally at a frequency slightly higher than the oscillator frequency, whereby variations in the work coupling will produce directional changes in the current circulating in such circuit effective to maintain the induced welding current substantially uniform, and means unaffected by fairly rapid changes in the aforesaid frequency relation of said oscillator and such circuit but responsive to relatively constant changes therein operative to adjust the relative tuning to compensate for such latter changes.

6. The method of induction heating which comprises passing the work through the field of an inductor having a predetermined amount of condensive reactance in circuit therewith, coupling such inductor to a source of high frequency alternating current the normal operating frequency of which is slightly lower than the resonant frequency of the inductor circuit, whereby rapid mechanical variations in the coupling of the inductor and work caused by movement of the latter will produce compensatory changes in the inductor current effective to maintain the induced current substantially constant, measuring phase relation between the source voltage and the inductor voltage at normal operating conditions, and adjusting the source frequency relative to the resonant frequency of such circuit when a change in such phase relation occurs during operation to maintain the aforesaid frequency relation.

7. In the method of producing welded tubing wherein a moving metal blank is progressively formed to tubular shape by bringing the edges thereof together and a high frequency welding current is induced therein by means of an induction heating coil and caused to flow along such edges to interfuse the same at the point of juncture therebetween; inserting condensive reactance in circuit with such induction heating coil to permit the circuit thereof to resonate, and supplying current to such coil alternating at a frequency slightly lower than the resonant frequency of such circuit, such frequency relationship causing the inductor current to vary in response to drifting of such point of juncture relative to said coil to maintain the induced welding current substantially constant.

8. In tube welding apparatus, including means for shaping a metal blank to tubular form by progressively bringing the edges thereof together, and a high frequency induction coil through which such blank is moved operative to induce welding current therein at the point of contact of such edges; means operative automatically and substantially instantaneously to compensate for drifting of said point of contact with consequent variation in the effective coupling of the coil and the work, said means comprising a condenser connected to form a resonant circuit with the inductor, a high frequency electronic oscillator having a tuned plate circuit, means inductively coupling the heating coil to such plate circuit, said oscillator and the resonant circuit of the induction coil being tuned relatively such that the latter will resonate normally at a frequency slightly higher than the resonant frequency of the oscillator plate circuit, variations in the work coupling producing changes in the induction coil current effective to maintain the induced welding current substantially uniform as a result of such frequency relationship of the inductively coupled oscillator and coil circuits.

9. In a continuous tube welding operation wherein electric current is caused to flow along converging edges of a rapidly advancing generally tubular metal blank and across such edges at the point of juncture thereof, such current being supplied at a region spaced upstream of such point and the latter having a tendency to shift longitudinally relative to such region in the operation, maintaining the current in the blank substantially constant despite such shifting of the point of edge juncture by supplying the electrical energy to the blank from a resonant work circuit, inductively coupling such work circuit to a high-frequency electronic oscillator for energization of the former by the latter, and operating such oscillator at a frequency which is lower by a predetermined amount than the frequency of resonance of such work circuit, such frequency relationship of the oscillator and work circuit causing the current in the latter to vary automatically to compensate for the load impedance changes produced by shifting of the point of juncture of the blank edges.

References Cited in the file of this patent

UNITED STATES PATENTS

| | | |
|---|---|---|
| 1,551,822 | Grant | Sept. 1, 1925 |
| 2,090,692 | Melton | Aug. 24, 1937 |
| 2,205,424 | Leonard | June 25, 1940 |
| 2,416,172 | Gregory et al. | Feb. 18, 1947 |
| 2,523,791 | Vahle et al. | Sept. 26, 1950 |
| 2,551,756 | Mittelmann | May 8, 1951 |
| 2,563,098 | Brown | Aug. 7, 1951 |
| 2,723,517 | Mittelmann | Mar. 15, 1955 |

FOREIGN PATENTS

| | | |
|---|---|---|
| 377,655 | Great Britain | Jan. 21, 1931 |